Oct. 28, 1930.                A. M. JOHNSON              1,779,674
                            ROTARY WORK SUPPORT
                  Original Filed March 8, 1923    2 Sheets-Sheet 1
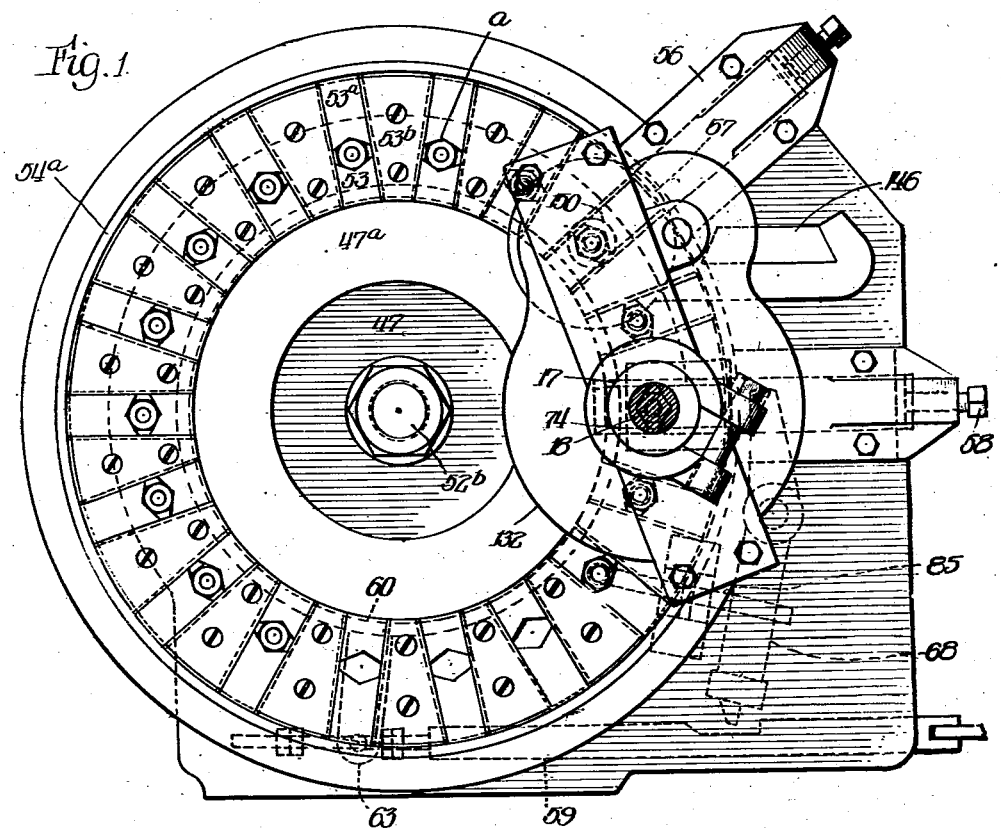
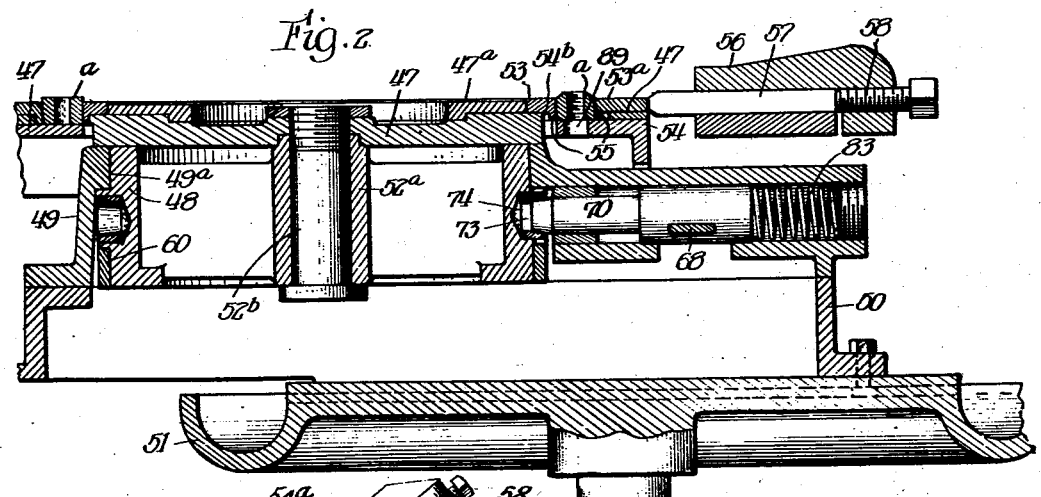
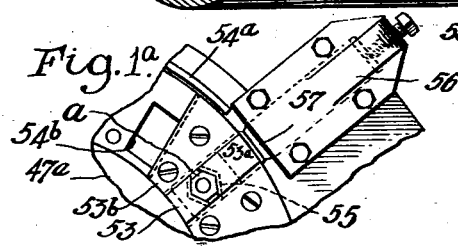
Inventor:
Albert M. Johnson,

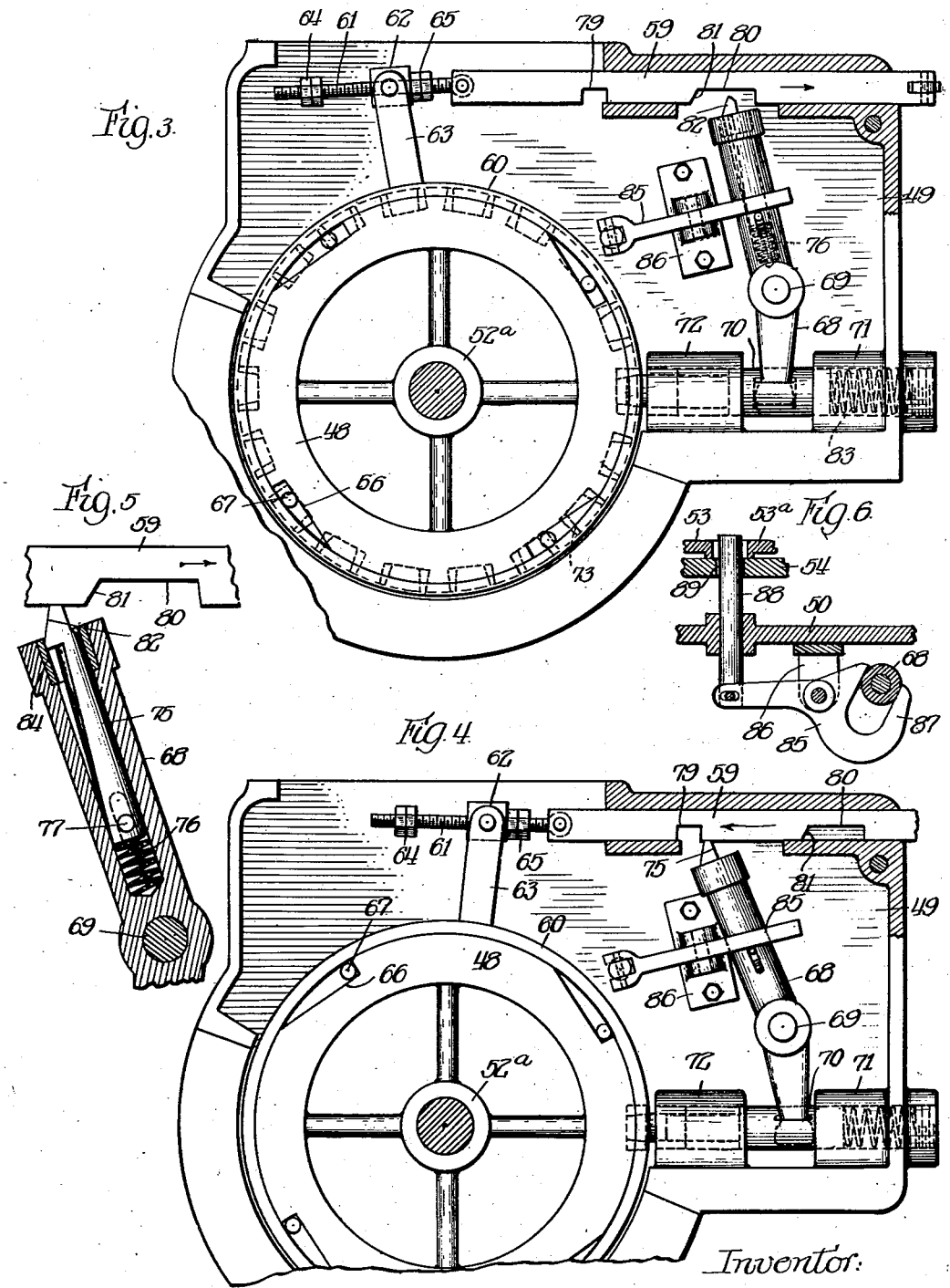

Patented Oct. 28, 1930

1,779,674

UNITED STATES PATENT OFFICE

ALBERT M. JOHNSON, OF ROCKFORD, ILLINOIS, ASSIGNOR TO BARNES DRILL CO., OF ROCKFORD, ILLINOIS, A CORPORATION OF ILLINOIS

ROTARY WORK SUPPORT

Original application filed March 8, 1923, Serial No. 623,631. Divided and this application filed March 13, 1924. Serial No. 698,837.

The invention pertains to a machine tool embodying a spindle reciprocable to carry a cutting tool into and out of operative association with pieces of work successively presented to the tool; and it has particular reference to the means for presenting the work to the tool and to the means for ejecting the work when the machining operation has been completed.

The object of the invention is to provide a rotary work support of an advantageous character for presenting the work to the tool spindle, and a novel means associated with the work support for ejecting the work after the drilling or other operation has been completed.

Fig. 1 is a plan view of the rotary support for presenting the work to the tool, the tool spindle being shown in section.

Fig. 1$^a$ is a fragmentary view of the parts shown in Fig. 1 showing details of the support and the locking means therefor.

Fig. 2 is a fragmentary vertical sectional view illustrating details of construction of the table or turret in which the work is mounted for presentation to the tool.

Figs. 3 and 4 are underside views of the work table, showing the table-locking and work-ejector mechanisms in different operative positions.

Fig. 5 is a fragmentary horizontal section, illustrating a portion of the work-ejector and table locking mechanism.

Fig. 6 is a fragmentary vertical sectional view illustrating another portion of this mechanism.

My invention is especially adapted for machine tools automatic in character, such, for example as that shown in my copending application Serial No. 623,631 filed March 8, 1923, (Patent No. 1,679,529) of which this application is a division. Herein the tool spindle carrying at its lower end a suitable cutting tool is shown in section at 18.

My improved work support comprises, a circular table or turret 47, the work being herein shown as having the form of nut blanks $a$ to be faced and tapped. This turret is mounted for rotation with a step by step movement to present the blanks $a$ successively to the cutting tool or tools, as the case may be. Herein the turret is shown as having a rigid depending ring 48 whose periphery is grooved to receive an inturned flange constituting an annular way 49$^a$. This way is formed on a supporting frame 49 mounted upon a stationary table 50, and beneath the latter is a chip pan 51, the whole being mounted for vertical adjustment in any suitable manner not herein shown. A central bearing sleeve or hub 52$^a$ rigid with the depending ring 48 receives a stud 52$^b$ securely fastened in the stationary table 50.

For holding the blanks in position while being operated upon, I provide a pair of clamping jaws 53 and 53$^a$ mounted for sliding movement in radial grooves formed on the upper face of the turret, and between plates 53$^b$ (Fig. 1.) The inner ends of the jaws 53 normally abut the outer periphery of a ring 47$^a$ centered on the turret 47; and the outer ends of the jaws 53$^a$ are normally retained in a free position within an annular rim or flange 54$^a$ (Figures 1 and 1$^a$) attached to a work supporting plate 54 which is supported above the stationary table 50. In Fig. 1$^a$ the rim 54$^a$ is shown as being cut away upon the rear side of the table to render the jaws accessible by the cam 57 to be presently described. Near its outer edge the turret is provided with apertures 54$^b$ to receive depending lips 55 upon the adjacent ends of the jaws 53 and 53$^a$ which are adapted to engage with the blank; and these lips 55 further serve to limit the sliding movement of the jaws.

A bracket 56 stationarily supported at the inner or rear side of the table carries a cam member 57, the forward end of which operatively engages with the outer ends of the jaws 53$^a$ as the latter in their rotation pass below the cutting tool. This cam member is adjusted by means of a screw 58 so that when a blank is inserted between the jaws 53 and 53$^a$ the passage of the latter into engagement with the cam member will effect a firm gripping of the blank so as to hold it in place upon the table for the screw threading or other operation. I have herein shown two cam members mounted in brackets 56, one beneath a facing tool generally indicated at 10$^c$ 150, and the other beneath a tap or other thread cutting tool carried by the spindle 18.

The turret is rotated with a step-by-step motion through the operation of a reciprocatory rod 59 actuated by a suitable controlling mechanism such, for example, as that set forth in my said copending application Serial No. 623,631 (Patent No. 1,679,529). This rod 59 is slidably mounted upon the under side of the stationary table 50 and is operatively connected to the turret 47 through a suitable one way clutch. In the present instance, the rod 59 is connected with a band 60 encircling the depending ring 48 of the turret, through the medium of a screw-threaded rod 61 having a collar 62 thereon pivoted upon an arm 63 extending radially from the band 60. Stops 64 and 65 are arranged in spaced relation upon the rod 61 so as to provide a lost motion connection and thereby allow for a slackness in travel between the rod 59 and the collar 62 in either direction thereon.

In the periphery of the depending ring 48 of the turret there are formed a plurality of recesses 66 having inclined bottoms and containing rollers 67 of a size such that when the band is rotated in one direction, the rollers will wedge between it and the outwardly inclined bottom of the recess thus locking the band and table together. The arrangement is such that as the rod 59 is reciprocated, the one-way clutch device formed by the rollers 67 in the recesses 66, moves the table a distance equal to the distance between any two adjacent blanks $a$ upon the table.

Associated with this means for rotating the turntable I provide an indexing mechanism adapted to hold it against rotation while the cutting operation or operations are being performed, and to release it, upon the withdrawal of the tool, for movement to present the next adjacent blanks to their respective tools. This means in the present instance, comprises a lever 68 pivoted at 69 upon the under side of the stationary table 50. One end of this lever is pivotally connected with a plunger 70 slidable in bearings 71, 72 also formed upon the under side of the table 50 the inner end of the plunger being shaped to enter holes 73 formed in the periphery of the ring 48 of the turntable and preferably provided with bushings 74 (Fig. 2). The other end of the lever 68 has slidable longitudinally therein a finger 75 (Fig. 5) normally projecting forwardly from the lever through the action of a coiled expansion spring 76. Outward movement of the finger 75 is limited by a pin and slot connection 77.

The bar 59 is provided with a pair of notches 79 and 80. The outer one of these notches, 80, has its innermost wall inclined as at 81 (Fig. 3) and when the rod is in its foremost or initial position, before its movement to effect a rotation of the table, the finger lies within this notch. As the rod moves rearwardly the bevelled end 81 of the notch 80 engages with a correspondingly bevelled surface 82 of the finger 75, forcing the finger inwardly into the lever 68 against the action of the spring 76 (see Fig. 5). In this movement of the rod, the band 60 remains stationary by reason of the lost motion connection between it and the rod afforded by the spacing of the stops 64—65, the turntable being locked in this position of the parts by the plunger 70 which is held in its innermost position by a coiled compression spring 83 in the outer bearing 71 for the plunger. As the notch 79 moves into position to receive the finger 75, the latter is forced outwardly by the action of its spring. The bar 59 now is moved forwardly and the finger is engaged to swing the lever 68 to free the table. The finger, it will be observed (Fig. 5), is notched or cut away at its forward side to form a shoulder 84, and in this movement of the bar 59, the shoulder engages with the free end of the lever 68 (Fig. 4) so as to hold the finger in its projected position. Consequently the plunger 70 is held withdrawn by the lever 68, until the bar moves forwardly far enough to carry the notch 80 into position to receive the finger 75. Thereupon, the bar is again reversed and the lever operated by the spring 83 to again lock the table.

It will be observed that the arrangement of the stops 64 and 65 with respect to the collar 62 is such that as the bar 59 moves into its rearmost position the stop 64 engaging with the collar moves the band 60 while the turntable or turret remains locked by the plunger 70; and in the forward stroke of the bar, the stop 65 engages with the collar 62, after the withdrawal of the plunger 70 during the slack portion of the stroke, and this movement of the collar effects the movement of the band 60 whereby to advance the turret and thus present the next blank to the cutting tool. By adjusting the stops 64 and 65 the extent of movement desired is readily obtainable.

Operatively associated with the indexing mechanism is a means for ejecting the work from the turret and this means comprises a lever 85 pivoted upon the under side of the stationary table 50 in a bracket 86 (Figs. 3, 4 and 6). One end of this lever 85 is in the shape of a fork (Fig. 6) having inclined arms 87 adapted to straddle the lever 68 and constituting cams whereby the swinging movements of the lever 68 on a vertical axis serve to effect a swinging movement of the lever 85 on a horizontal axis. The opposite end of this lever 85 is pivotally connected to a plunger 88 slidable through the table 50 and adapted to enter apertures 89 provided in the plate 54 below the space between the work clamping jaws 53—53ª normally occupied by the work. As shown, the aperture 89 is of less diameter than the work so that the latter is supported over the edges of the aperture and the plunger constitutes an ejector operable to force the work from the turret as permitted by the release thereof as soon as the clamping jaws pass free of the cam 57. The arrangement is such that as the lever 68 is swung inwardly to move the plunger 70 of the indexing mechanism out of engagement with the table and thus release the table for movement, the ejector 88 is withdrawn from the aperture 89 in the table; and when the lever 68 is operated in a reverse direction to lock the table, the ejector is simultaneously operated to discharge the work which has been moved into position over the ejector.

I claim as my invention:

1. The combination with a work table, of a reciprocatory operating member, locking means for said table, means intermediate said member and locking means operable as said member moves in one direction to release said locking means, and a connection between said member and said table arranged to advance said table upon a continuation of movement of said member in the table releasing direction.

2. The combination with a work table, of a reciprocatory operating member, means engaging said table operable by said member while said member moves in one direction positively to maintain the table in a stationary position and means operable by said member and adapted as said member moves in a reverse direction to successively release said holding means and advance said table.

3. The combination with a work table, of a locking means for said table, an operating member moving periodically in opposite directions and adapted during one of its strokes to advance said table, and means operable by said member during the initial portion of said advancing stroke to release said locking means.

4. The combination with a work table, of locking means for the table, an operating member connected to said table by a one way clutch and a lost motion device, said member being adapted to periodically advance the table, and means operable by said member during the slack portion of the advancing stroke of said member to release said locking means.

5. The combination with a work table, of locking means for the table, a member moving periodically in opposite directions and adapted to advance the table as it moves in one direction, a lost motion connection interposed between said table and said member permitting relative travel therebetween, and means operated by said member to release said locking means during the period of relative travel permitted by said lost motion connection.

6. In a machine tool, a turntable, a reciprocatory bar operatively connected with the table to advance it with a step-by-step motion, means operating intermittently to lock the table against movement including a spring pressed plunger, a lever connected with said plunger and having a yielding finger mounted in one end thereof, said bar having a pair of notches therein adapted to receive said finger, one of said notches being adapted as the bar moves in one direction to force the finger into the lever until the other one of said notches is moved opposite the finger, said finger being adapted to engage with the lever as the bar moves in the opposite direction whereby to effect the swinging movements of the lever and the withdrawal of said plunger.

7. The combination of a work table, means for locking the table against movement including a pivoted lever, and a work-ejector means for the table operatively associated with said lever so as to be actuated in the swinging movements of the latter.

8. The combination of a work table, means for locking the table against movement including a pivoted lever, and a work-ejector means for the table operatively associated with said lever so as to be actuated in the swinging movements of the latter, said ejector means including a second lever having a sliding cam connection with the first lever.

9. The combination of a work table, locking means for the table including a member swingable on a vertical axis, a work ejector means including a lever mounted to swing on a horizontal axis and having a sliding cam connection with said member.

10. The combination of a turntable, a reciprocatory operating member, means operable as said member moves in one direction to lock the table and as said member moves in the opposite direction to release and advance the table, and means also operable in the first mentioned movement of the operating member to eject a piece of work from the turntable.

11. The combination of a turntable, a reciprocatory operating member, means operable as said member moves in one direction to lock the table and as said member moves in the opposite direction to release and advance the table, means operable in the advance of the table to clamp one piece of work and release another, and means operable as the table is locked to eject said other piece of work therefrom.

12. In a machine tool, a turntable having a plurality of peripherally spaced recesses, a lock plunger adapted to set selectively into said recesses, a one-way clutch for rotating said table, a reciprocatory bar having a lost motion connection with said clutch, said bar being formed with a pair of spaced recesses, and means operatively connected to said plunger and adapted to engage in said recesses selectively in the reciprocation of said bar to withdraw said plunger from said table before indexing, and to return said plunger to said table after indexing.

In testimony whereof, I have hereunto affixed my signature.

ALBERT M. JOHNSON.